United States Patent
Smith

[15] 3,676,493
[45] July 11, 1972

[54] ALKANOLAMINE DERIVATIVES

[72] Inventor: Leslie Harold Smith, Macclesfield, England

[73] Assignee: Imperial Chemical Industries Limited, London, England

[22] Filed: July 3, 1969

[21] Appl. No.: 839,810

[30] Foreign Application Priority Data

July 18, 1968   Great Britain....................34,255/68

[52] U.S. Cl....................260/559 A, 260/307 F, 260/348 A, 260/472, 260/488 CD, 260/404.5, 260/501.17, 424/272, 424/324
[51] Int. Cl....................................C07c 103/30
[58] Field of Search...........................260/559, 562, 501.17

[56] References Cited

UNITED STATES PATENTS 3,254,120  5/1966  Mayr et al..............................260/559
3,408,387  10/1968  Howe et al..............................260/562

*Primary Examiner*—Henry R. Jiles
*Assistant Examiner*—Harry I. Moatz
*Attorney*—Cushman, Darby & Cushman

[57] ABSTRACT

The disclosure relates to 1-amino-3-(carbamoylphenoxy)-2-propanol derivatives, processes for their manufacture, pharmaceutical compositions containing them and a method of using them to produce cardiac β-adrenergic blockade in warm-blooded animals. Representative of the compounds disclosed is 3-(2-chloro-4-n-hexylcarbamoylphenoxy)-1-t-butylamino-2-propanol.

14 Claims, No Drawings

ALKANOLAMINE DERIVATIVES

This invention relates to new alkanolamine derivatives which possess β-adrenergic blocking activity as demonstrated by the reversal of isoprenaline-induced tachycardia in cats, and which are therefore useful in the treatment or prophylaxis of heart diseases, for example angina pectoris and cardiac arrhythmias, and in the treatment of hypertension and phaeochromocytoma, in man.

According to the invention we provide alkanolamine derivatives of the formula:

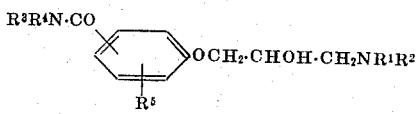

wherein $R^1$ stands for hydrogen or for an alkyl radical; wherein $R^2$ stands for hydrogen, or for an alkyl radical which may optionally be substituted by one or more substituents selected from hydroxy, aryl and aryloxy radicals, or for a cycloalkyl radical; wherein $R^3$ stands for hydrogen or for an alkyl radical; wherein $R^4$ stands for an alkyl, hydroxyalkyl, alkoxyalkyl, cycloalkyl, alkenyl, aryl, substituted aryl, aralkyl or substituted aralkyl radical; and wherein $R^5$ stands for hydrogen, or for a halogen atom, or for an acylamino, alkyl, alkenyl, nitro, alkoxy, alkenyloxy or acyl radical; and the esters thereof; and the aldehyde condensation products thereof; and the acid-addition salts thereof.

It is to be understood that the above definition of alkanolamine derivatives encompasses all possible stereoisomers thereof, and mixtures thereof. In particular, said definition encompasses both racemic and optically active compounds.

As a suitable value for $R^1$, $R^3$ or $R^5$ when it stands for an alkyl radical there may be mentioned, for example, an alkyl radical of up to four carbon atoms, for example the methyl, ethyl or n-propyl radical.

As a suitable value for $R^2$ when it stands for an alkyl radical which may optionally be substituted there may be mentioned, for example, an alkyl radical of up to six carbon atoms, for example the ethyl, n-propyl, isopropyl, n-butyl, s-butyl or t-butyl radical, which may optionally be substituted by one or more, and preferably one, hydroxy, phenyl or phenoxy radicals. Preferably the alkyl or substituted alkyl radical $R^2$ contains three or four carbon atoms and is branched at the α-carbon atom. A specific value for $R^2$ when it stands for a substituted alkyl radical is, for example, the 2-hydroxy-1-methylethyl, 2-hydroxy-1,1-dimethylethyl, 1-methyl-2-phenoxyethyl,1,1-dimethyl-2-phenylethyl or 1-methyl-3-phenylpropyl radical.

As a suitable value for $R^2$ or $R^4$ when it stands for a cycloalkyl radical there may be mentioned, for example, a cycloalkyl radical of up to 8 carbon atoms, for example the cyclopropyl, cyclobutyl, cyclopentyl or cyclohexyl radical.

As a suitable value for $R^4$ when it stands for an alkyl or hydroxyalkyl radical there may be mentioned, for example, an alkyl or hydroxyalkyl radical each of up to 10 carbon atoms, for example the methyl, ethyl, n-propyl, isopropyl, n-butyl, n-pentyl, isopentyl, n-hexyl, n-nonyl, 2-hydroxyethyl, 2-hydroxy-1-methylethyl or 2-hydroxy-1,1-dimethylethyl radical.

As a suitable value for $R^4$ when it stands for an alkoxyalkyl radical there may be mentioned, for example, an alkoxyalkyl radical of up to 10 carbon atoms, for example the 2methoxyethyl radical.

As a suitable value for $R^4$ or $R^5$ when it stands for an alkenyl radical there may be mentioned, for example, an alkenyl radical of up to six carbon atoms, for example the allyl radical.

As a suitable value for $R^4$ when it stands for an aryl, substituted aryl, aralkyl or substituted aralkyl radical there may be mentioned, for example, an aryl or aralkyl radical of up to 12 carbon atoms, for example the phenyl, benzyl, phenethyl or 1,1-dimethyl-2-phenylethyl radical, any of which may optionally be substituted in the aromatic nucleus by one or more substituents selected from halogen atoms, for example chlorine and bromine atoms, and alkyl and alkoxy radicals each of up to four carbon atoms, for example methyl, ethyl, methoxy and ethoxy radicals. Particular values for $R^4$ when it stands for a substituted aryl radical are, for example, the p-tolyl and p-chlorophenyl radicals.

As a suitable value for $R^5$ when it stands for a halogen atom there may be mentioned, for example, the fluorine, chlorine, bromine or iodine atom.

As a suitable value for $R^5$ when it stands for an acylamino radical there may be mentioned, for example, an alkanoylamino, aroylamino, alkanesulphonamido or arenesulphonamido radical each of up to 10 carbon atoms, for example the acetamido, propionamido, benzamido, methanesulphonamido or benzenesulphonamido radical.

As a suitable value for $R^5$ when it stands for an alkylthio, alkoxy or alkenyloxy radical there may be mentioned, for example an alkylthio, alkoxy or alkenyloxy radical each of up to five carbon atoms, for example the methylthio, methoxy, isopropoxy or allyloxy radical.

As a suitable value for $R^5$ when it stands for an acyl radical there may be mentioned, for example, an acyl radical of up to six carbon atoms, for example the acetyl or propionyl radical.

As suitable esters of the alkanolamine derivatives there may be mentioned, for example, O-esters derived from an aliphatic carboxylic acid, for example such an acid of up to 20 carbon atoms, for example acetic, hexanoic, palmitic, stearic or oleic acid, or an aromatic carboxylic acid, for example such an acid of up to 10 carbon atoms, for example benzoic acid, and the acid-addition salts thereof.

It is to be understood that by the expression aldehyde condensation products we mean oxazolidine derivatives of the formula:

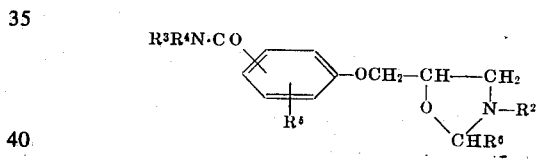

wherein $R^2$, $R^3$, $R^4$ and $R^5$ have the meanings stated above and wherein $R^6$ stands for hydrogen or for an alkyl radical, and the acid-addition salts thereof, which are derived from the alkanolamine derivatives of the invention of the stated formula wherein $R^1$ stands for hydrogen.

As a suitable value for $R^6$ when it stands for an alkyl radical there may be mentioned, for example, and alkyl radical of up to four carbon atoms, for example the isopropyl radical.

As suitable acid-addition salts of the alkanolamine derivatives of the invention, or the esters or the oxazolidines derived therefrom, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a Trade Mark).

A preferred group of alkanolamine derivatives of the invention comprises compounds of the formula:

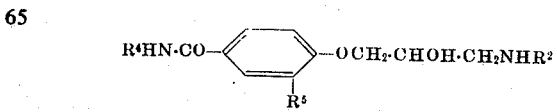

wherein $R^2$, $R^4$ and $R^5$ have the meanings stated above, and the acid-addition salts thereof. Of these, especially preferred compounds are those wherein $R^2$ stands for the isopropyl or t-butyl radical, $R^4$ stands for an alkyl radical of up to 10 carbon atoms and $R^5$ stands for the chlorine or bromine atom or for the n-propyl or allyl radical, or wherein $R^2$ stands for the isopropyl or t-butyl radical, $R^4$ stands for the cyclopropyl, cyclopentyl, allyl, benzyl or p-tolyl radical and $R^5$ stands for the chlorine atom.

Specific alkanolamine derivatives of the invention are, for example, those compounds hereinafter particularly described in Examples 1 to 18. Of these, particularly preferred compounds with respect to their high biological activity are those of the last formula given above wherein:

a. $R^2$ stands for the isopropyl or t-butyl radical, $R^4$ stands for the ethyl, isopropyl, n-hexyl, cyclopentyl or allyl radical and $R^5$ stands for the chlorine atom; and b. $R^2$ stands for the isopropyl or t-butyl radical, $R^4$ stands for the ethyl or n-propyl radical and $R^5$ stands for the bromine atom or the n-propyl radical; and c. $R^2$ stands for the isopropyl or t-butyl radical, $R^4$ stands for the ethyl or n-hexyl radical and $R^5$ stands for the allyl radical; and d. $R^2$ stands for the isopropyl radical, $R^4$ stands for the n-hexyl or allyl radical and $R^5$ stands for the bromine atom; and the acid-addition salts thereof.

The most preferred compounds are 3-(2-chloro-4-n-hexylcarbamoylphenoxy)-1-t-butylamino-2-propanol; 3-(2-chloro-4-cyclo-pentylcarbamoylphenoxy)-1-t-butylamino-2-propanol; 3-(2-chloro-4-isopropylcarbamoylphenoxy)-1-isopropylamino- 2-propanol and 3-(2-chloro-4-isopropylcarbamoylphenoxy)-1-t-butylamino-2-propanol and the acid-addition salts thereof.

According to a further feature of the invention we provide a process for the manufacture of the alkanolamine derivatives of the invention which comprises the reaction of a compound of the formula:

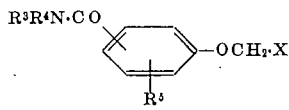

wherein $R^3$, $R^4$ and $R^5$ have the meanings stated above, and wherein X stands for the group

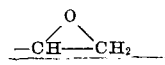

or the group $-CHOH \cdot CH_2Y$, wherein Y stands for a halogen atom, or of mixtures of such compounds wherein X has both meanings stated above, with an amine of the formula $NHR^1R^2$, wherein $R^1$ and $R^2$ have the meanings stated above.

As a suitable value for Y there may be mentioned, for example, a chlorine or bromine atom. The interaction may be carried out at ambient temperature or it may be accelerated or completed by the application of heat, for example by heating to a temperature of 90°-110° C.; it may be carried out at atmospheric or at an elevated pressure, for example by heating in a sealed vessel; and it may be carried out in an inert diluent or solvent, for example methanol, ethanol or n-propanol, or an excess of the amine of the formula $NHR^1R^2$, wherein $R^1$ and $R^2$ have the meanings stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of those of the alkanolamine derivatives of the invention wherein $R^1$ stands for hydrogen and $R^2$ does not stand for a hydrogenolyzable group which comprises the hydrogenolysis of a compound of the formula:

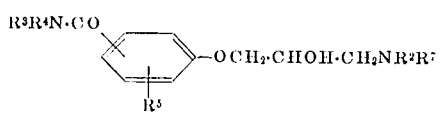

wherein $R^2$, $R^3$, $R^4$ and $R^5$ have the meanings stated above and wherein $R^7$ stands for a hydrogenolyzable radical, or of an acid-addition salt thereof.

As a suitable value for $R^7$ there may be mentioned, for example, the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrogen chloride or oxalic acid, and it may be carried out at ambient temperature and at atmospheric pressure.

According to a further feature of the invention we provide a process for the manufacture of the alkanolamine derivatives of the invention which comprises the reaction of a phenol of the formula:

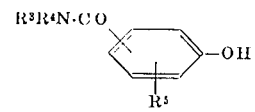

wherein $R^3$, $R^4$ and $R^5$ have the meanings stated above, with a compound of the formula:

$$X-CH_2NR^1R^2$$

wherein $R^1$, $R^2$ and X have the meanings stated above, or an acid-addition salt thereof.

The last-mentioned reaction may conveniently be carried out in the presence of an acid-binding agent, for example sodium hydroxide. Alternatively, an alkali metal derivative of the phenol reactant, for example the sodium or potassium derivative, may be used as starting material. The reaction may be carried out in a diluent or solvent, for example methanol or ethanol, and it may be accelerated or completed by the application of heat, for example by heating to the boiling point of the diluent or solvent.

According to a further feature of the invention we provide a process for the manufacture of optically-active enantiomorphs of the alkanolamine derivatives of the invention which comprises the resolution by conventional means of the corresponding racemic alkanolamine derivative of the invention.

The said resolution may be carried out by reacting the racemic alkanolamine derivative with an optically-active acid, followed by fractional crystallization of the diastereoisomeric mixture of salts thus obtained, from a diluent or solvent, for example ethanol, whereafter the optically-active alkanolamine derivative is liberated from the salt by treatment with a base. A suitable optically-active acid is, for example, (+)— or (−)— O,O-di-p-toluoyltartaric acid.

The resolution process may be facilitated by treating the partially resolved alkanolamine derivative in free base form obtained after a single fractional crystallization of the diastereoisomeric mixture of salts with a solubilizing agent, for example a primary amine, for example allylamine, in a relatively non-polar diluent or solvent, for example petroleum ether, by the process generally described in our co-pending United Kingdom Application No. 37523/68.

According to a further feature of the invention we provide a process for the manufacture of the esters of the alkanolamine derivatives of the invention which comprises the reaction of an acid-addition salt of the corresponding unesterified alkanolamine derivative with an acylating agent.

As a suitable acylating agent there may be mentioned, for example, an acid halide or acid anhydride derived from an aliphatic or aromatic carboxylic acid as defined above. Thus a suitable acylating agent is, for example, acetic anhydride or hexanoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of the oxazolidine derivatives of the alkanolamines of the invention which comprises the reaction of the corresponding alkanolamine derivative wherein $R^1$ stands for hydrogen, or an acid-addition salt thereof, with an aldehyde of the formula $R^6CHO$, wherein $R^6$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

The alkanolamine derivatives of the invention and the esters thereof and the aldehyde condensation products thereof in free base form may be converted into acid-addition salts thereof by reaction with an acid by conventional means.

As stated above, the alkanolamine derivatives of the invention and the acid-addition salts thereof are of value in the treatment or prophylaxis of heart diseases. Furthermore, some of these compounds possess selective β-adrenergic blocking activity. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxypheny)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, and dispersible powders, sprays and aerosol formulations.

The pharmaceutical compositions of the invention may contain in addition to the alkanolamine derivative of the invention, one or more drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide, hypotensive agents, for example reserpine, bethanidine and guanethidine; myocardial depressants, for example quinidine, agents used in the treatment of Parkinson's disease, for example benzhexol; cardiotonic agents, for example digitalis preparations; and sympathomimetic bronchodilators, for example isoprenaline, orciprenaline, adrenaline and ephedrine.

It is expected that the alkanolamine derivative would be given to man at a total oral dose of between 20 mg. and 600 mg. daily, at doses spaced at 6-8 hourly intervals, or at an intravenous dose of between one mg. and 20 mg. Preferred oral dosage forms are tablets or capsules containing between 10 and 100 mg., and preferably 10 mg. or 40 mg., of active ingredient. Preferred intravenous dosage forms are sterile aqueous solutions of the alkanolamine derivative or of a non-toxic acid-addition salt thereof, containing between 0.05 percent and 1 percent w/v of active ingredient, and more particularly containing 0.1 percent w/v of active ingredient.

The invention is illustrated but not limited by the following Examples in which the parts are by weight (where no melting point is given for a compound the molecular analyses and/or infra-red spectra are satisfactory):

EXAMPLE 1

A mixture of 0.75 part of 1,2-epoxy-3-(4-phenylcarbamoylphenoxy)propane, 20 parts of isopropylamine and 10 parts of ethanol is heated in a sealed vessel at 100° C. for 10 hours. The mixture is cooled and evaporated to dryness under reduced pressure and the residue is dissolved in 25 parts of aqueous N-hydrochloric acid. The mixture is filtered and the filtrate is basified with 5 parts of aqueous 11N-sodium hydroxide solution. The mixture is filtered and the solid residue is washed with water, dried, and crystallized from ethyl methyl ketone. There is thus obtained 1-isopropylamino-3-(4-phenylcarbamoylphenoxy)-2-propanol, m.p. 184°-185° C.

The 1,2-epoxy-3-(4-phenylcarbamoylphenoxy)propane used as starting material may be obtained as follows:

2.34 Parts of epichlorohydrin are added to a solution of 2.13 parts of N-phenyl-4-hydroxybenzamide and 0.4 part of sodium hydroxide in 50 parts of water which is maintained at 15° C. The mixture is stirred for six hours at ambient temperature and then filtered, and the solid residue is washed with water. There is thus obtained 1,2-epoxy-3-(4-phenylcarbamoylphenoxy)propane, m.p. 232°-234° C.

EXAMPLE 2

A mixture of 1 part of 1-chloro-3-(4-methylcarbamoylphenoxy)-2-propanol and 25 parts of isopropylamine is heated in a sealed vessel at 100° C. for 10 hours. This mixture is cooled and evaporated to dryness under reduced pressure and the solid residue is extracted twice with 10 parts of hot ethyl methyl ketone each time. The combined extracts are cooled and filtered and the solid residue is crystallized from acetone. There is thus obtained 1-isopropylamino-3-(4-methylcarbamoylphenoxy)-2-propanol, m.p. 146°-148° C.

The 1-chloro-3-(4-methylcarbamoylphenoxy)-2-propanol used as starting material may be obtained as follows:

A mixture of 5 parts of ethyl 4-hydroxybenzoate, 3.5 parts of methylamine and 20 parts of ethanol is heated in a sealed vessel at 110° C. for 12 hours. The mixture is cooled and evaporated to dryness under reduced pressure and the residue is stirred with 25 parts of water. The mixture is filtered and the filtrate is evaporated to dryness under reduced pressure. The residue is crystallized from a mixture of 10 parts of ethyl acetate and 5 parts of cyclohexane and there is thus obtained N-methyl-4-hydroxybenzamide, m.p. 140° C.

A mixture of 0.9 part of the above compound, 10 parts of epichlorohydrin and 0.1 part of piperidine is heated at 90° C. for six hours. The mixture is cooled and evaporated to dryness under reduced pressure. The residue consists of 1-chloro-3-(4—METHYL—CARBAMOYLPHENOXY)-2-propanol.

EXAMPLE 3

A mixture of 1.35 parts of 1-chloro-3-(4-n-propylcarbamoyl-phenoxy)-2-propanol and 25 parts of t-butylamine is heated in a sealed vessel at 100° C. for 12 hours. The mixture is cooled and evaporated to dryness under reduced pressure and the residue is crystallized from acetone. There is thus obtained 3-(4-n-propyl-carbamoylphenoxy)- 1-t-butylamino-2-propanol, m.p. 124°-125° C.

The process described above is repeated except that the appropriate chlorohydrin and amine are used as starting materials, and there are thus obtained by similar means the compounds described in the following table:

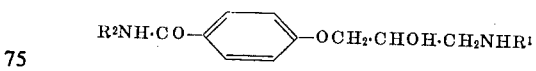

| R¹ | R² | m.p.(°C.) | Crystallization solvent |
|---|---|---|---|
| cyclopentyl | n-propyl | 146–147 | acetone |
| 2-hydroxy-1,1-dimethylethyl | n-propyl | 104–106 | acetone/petroleum ether (b.p. 60–80°C. |
| 1-methyl-3-phenylpropyl | n-propyl (b.p. 60–80° AC.) | 114–116 | acetone/petroleum ether |
| isopropyl | n-butyl | 114 | acetone |
| isopropyl | n-pentyl | 124 | acetone |
| isopropyl | ethyl | 128–130 | acetone |
| isopropyl | p-tolyl | 167–169 | ethanol |
| t-butyl | ethyl | 132 | acetone |

The 1-chloro-3-(4-n-propylcarbamoylphenoxy)-2-propanol used as starting material may be obtained as follows:

A mixture of 8.2 parts of n-propylamine and 50 parts of benzene is added gradually to a stirred solution of 10 parts of 4-acetoxybenzoyl chloride in 50 parts of benzene which is maintained at ambient temperature. The mixture is stirred at ambient temperature for one hour and is then evaporated to dryness under reduced pressure. The residue is stirred with 100 parts of water and filtered and the solid residue is crystallized from aqueous methanol. There is thus obtained 4-acetoxy-N-(n-propyl)benzamide, m.p. 96°–98° C.

A mixture of 8.7 parts of 4-acetoxy-N-(n-propyl)benzamide, 25 parts of aqueous N-sodium hydroxide solution and 20 parts of methanol is heated under reflux for 30 minutes. The mixture is cooled, acidified with aqueous 11N-hydrochloric acid and filtered and the solid residue is crystallized from aqueous ethanol. There is thus obtained 4-hydroxy-N-(n-propyl)benzamide, m.p. 82°–84° C.

A mixture of 5.8 parts of 4hydroxy-N-(n-propyl)benzamide, 25 parts of epichlorohydrin and 0.25 part of piperidine is heated at 90° C. for 6 hours and the mixture is then evaporated to dryness under reduced pressure. The residue consists of 1-chloro-3-(4-n-propylcarbamoylphenoxy)-2-propanol, and is used without purification.

EXAMPLE 4

A mixture of 2.6 parts of 1,2-epoxy-3-(2-phenylcarbamoylphenoxy)propane and 10 parts of isopropylamine is heated at 90° C. for one hour. The mixture is cooled and evaporated to dryness under reduced pressure and the residue is washed with 50 parts of aqueous 2N-hydrochloric acid. The aqueous acidic phase is decanted off and the residue is washed with 50 parts of ether. The ethereal phase is decanted off, the residue is basified with aqueous 2N-sodium hydroxide solution and the mixture is extracted with 50 parts of ether. The ethereal phase is separated, dried over anhydrous magnesium sulphate and evaporated to dryness under reduced pressure. The residue is crystallized from petroleum ether (b.p. 100°–120° C.) and there is thus obtained 1-isopropylamino-3-(2-phenylcarbamoyl-phenoxy)-2-propanol, m.p. 109°–111° C.

The 1,2-epoxy-3-(2-phenylcarbamoylphenoxy)propane used as starting material may be obtained as follows:

11.6 Parts of epichlorohydrin are added to a solution of 21.3 parts of salicylanilide and 4.8 parts of sodium hydroxide in 100 parts of water which is maintained at 15° C. The mixture is stirred for 18 hours at ambient temperature and is then extracted with 50 parts of chloroform. The chloroform phase is separated, washed with 100 parts of 10 percent aqueous acetic acid and then with 100 parts of water, dried over anhydrous magnesium sulphate and evaporated to dryness under reduced pressure. The residue consists of 1,2-epoxy-3-(2-phenylcarbamoylphenoxy)propane and is used without purification.

EXAMPLE 5

A mixture of 1.5 parts of 1-chloro-3-(2-nitro-4-n-propylcarbamoylphenoxy)-2-propanol and 10 parts of t-butylamine is heated in a sealed vessel at 100° C. for 12 hours. The mixture is cooled and evaporated to dryness under reduced pressure and the residue is stirred with 25 parts of aqueous N-hydrochloric acid and 25 parts of ether. The acidic aqueous layer is separated and basified with aqueous 11N-sodium hydroxide solution and the mixture is extracted with 25 parts of ethyl acetate. The ethyl acetate layer is separated, dried over anhydrous magnesium sulphate and evaporated to dryness under reduced pressure. The residue is crystallized from a mixture of 10 parts of acetone and 10 parts of petroleum ether (b.p. 60°–80° C.) and there is thus obtained 3-(2-nitro-4-n-propyl-carbamoylphenoxy)-1-t-butylamino-2-propanol, m.p. 144°–146° C.

The 1-chloro-3-(2-nitro-4-n-propylcarbamoylphenoxy)-2-propanol used as starting material may be obtained as follows:

A mixture of 9.15 parts of 4-hydroxy-3-nitrobenzoic acid and 30 parts of acetyl chloride is heated under reflux for 30 minutes. The mixture is evaporated to dryness under reduced pressure, 30 parts of thionyl chloride are added and the mixture is heated under reflux for three hours. The mixture is evaporated to dryness under reduced pressure and the residue consists of 4-acetoxy-3-nitro-benzoyl chloride.

A solution of 5 parts of 4-acetoxy-3-nitro-benzoyl chloride in 35 parts of benzene is added to a stirred solution of 4.5 parts of n-propylamine in 35 parts of benzene which is maintained at ambient temperature. The mixture is stirred at ambient temperature for 1 hour and then evaporated to dryness under reduced pressure. The residue is stirred with 50 parts of aqueous N-hydrochloric acid and the mixture is filtered. The solid residue is washed with water and crystallized from a mixture of 25 parts of ethanol and 50 parts of water. There is thus obtained 3-nitro-4-hydroxy-N-(n-propyl)benzamide, m.p. 124°–126° C.

A mixture of 3 parts of 3-nitro-4-hydroxy-N-(n-propyl)-benzamide, 25 parts of epichlorohydrin and 0.1 part of piperidine is heated at 90° C. for 6 hours. The mixture is evaporated to dryness under reduced pressure and the residue consists of 1-chloro-3-(2-nitro-4-n-propylcarbamoylphenoxy)-2-propanol.

EXAMPLE 6

A mixture of 3 parts of 1-chloro-3-(2-chloro-4-n-propylcarbamoylphenoxy)-2-propanol, 5 parts of isopropylamine and 10 parts of ethanol is heated in a sealed vessel at 100° C. for 10 hours. The mixture is cooled and evaporated to dryness under reduced pressure and the residue is dissolved in 50 parts of aqueous 2N-hydro-chloric acid. The mixture is filtered and the filtrate is basified with aqueous 11N-sodium hydroxide solution. The mixture is extracted twice with 50 parts of ethyl acetate each time and the combined extracts are dried over anhydrous magnesium sulphate and evaporated to dryness under reduced pressure. The residue is crystallized from a mixture of 20 parts of acetone and 1 part of ethanol and there is thus obtained 3-(2-chloro-4-n-propylcarbamoyl-phenoxy)-1-isopropylamino-2-propanol, m.p. 138° C.

The 1-chloro-3-(2-chloro-4-n-propylcarbamoylphenoxy)-2-propanol used as starting material may be obtained as follows:

A mixture of 8.6 parts of 3-chloro-4-hydroxybenzoic acid and 30 parts of acetyl chloride is heated under reflux for 30 minutes. The mixture is evaporated to dryness under reduced pressure, 30 parts of thionyl chloride are added and the mixture is heated under reflux for three hours. The mixture is evaporated to dryness under reduced pressure and the residue consists of 4-acetoxy-3-chlorobenzoyl chloride.

A solution of 11.5 parts of 4-acetoxy-3-chlorobenzoyl chloride in 50 parts of benzene is added to a stirred solution of 8.2 parts of n-propylamine in 50 parts of benzene which is maintained at ambient temperature. The mixture is stirred at ambient temperature for one hour and then evaporated to dryness under reduced pressure. The residue is heated under reflux for five minutes with 150 parts of aqueous N-sodium hydroxide solution, the mixture is filtered and the filtrate is acidified with aqueous 11N-hydrochloric acid. The mixture is filtered and the solid residue is washed with water and crystallized from a mixture of 25 parts of ethanol and 50 parts of water. There is thus obtained 3-chloro-4-hydroxy-N-(n-propyl)-benzamide, m.p. 76°–78° C.

A mixture of 4.2 parts of 3-chloro-4-hydroxy-N-(n-propyl)-benzamide, 25 parts of epichlorohydrin and 0.1 part of piperidine is heated at 90° C. for 6 hours. The mixture is evaporated to dryness under reduced pressure and the residue consists of 1-chloro-3-(2-chloro-4-n-propylcarbamoylphenoxy)-2-propanol.

EXAMPLE 7

A mixture of 2.3 parts of 1,2-epoxy-3-(2-phenylcarbamoyl-4-propionamidophenoxy)propane and 20 parts of isopropylamine is kept at ambient temperature for 24 hours and is then evaporated to dryness under reduced pressure. The residue is shaken with 25 parts of aqueous N-hydrochloric acid and 25 parts of ether and the acidic aqueous layer is separated, basified with aqueous 11N-sodium hydroxide solution and extracted twice with 25 parts of ethyl acetate each time. The combined extracts are dried and evaporated to dryness and the residue is dissolved in ethanol. A saturated solution of picric acid in ethanol is added and the mixture is filtered. The solid product is crystallized from ethanol and there is thus obtained 1-isopropylamino-3-(2-phenylcarbamoyl-4-propionamidophenoxy)-2-propanol picrate hemihydrate, m.p. 200° C.

The 1,2-epoxy-3-(2-phenylcarbamoyl-4-propionamidophenoxy)-propane used as starting material may be obtained as follows:

A solution of 9 parts of sulphanilic acid, 2.5 parts of anhydrous sodium carbonate and 3.5 parts of sodium nitrite in 60 parts of water is cooled to 15° C. and then added to a mixture of 55 parts of ice and 10 parts of concentrated hydrochloric acid. The mixture is allowed to stand for 15 minutes and is then added to a solution of 8.56 parts of 2-hydroxy-N-phenyl-benzamide and 10 parts of sodium hydroxide in 100 parts of ice/water mixture. The mixture is kept at ambient temperature for one hour, the pH of the mixture is then adjusted to eight and 21 parts of sodium dithionite are added. The mixture is heated at 45° C. for 15 minutes and is then cooled and filtered. The solid residue consists of 3-amino-6-hydroxy-N-phenyl-benzamide.

A mixture of 4.3 parts of 3-amino-6-hydroxy-N-phenyl-benzamide, 8 parts of propionic anhydride and 50 parts of water is heated under reflux for three hours and is then filtered whilst still hot. The filtrate is cooled and filtered and there is thus obtained as solid residue 6-hydroxy-N-phenyl-3-propionamidobenzamide, m.p. 152° C.

3.26 Parts of epichlorohydrin are added to a solution of 2 parts of 6-hydroxy-N-phenyl-3-propionamidobenzamide and 0.32 part of sodium hydroxide in 25 parts of water and the mixture is stirred at ambient temperature for 18 hours. The mixture is extracted twice with 50 parts of chloroform each time and the combined extracts are dried and evaporated to dryness. The oily residue consists of 1,2-epoxy-3-(2-phenyl-carbamoyl-4-propionamido-phenoxy)propane.

EXAMPLE 8

A mixture of 2.5 parts of 1-chloro-3-(2-n-butylcarbamoyl-4-propionamidophenoxy)-2-propanol, 20 parts of methanol and 20 parts of t-butylamine is heated in a sealed vessel at 110° C. for 12 hours and is then cooled and evaporated to dryness. The residue is partitioned between 100 parts of ethyl acetate and 100 parts of water and the ethyl acetate layer is separated, washed with 50 parts of water, dried and evaporated to dryness. The residue is crystallized from a mixture of ethyl acetate and petroleum ether (b.p. 60°–80° C.) and there is thus obtained 1-t-butylamino-3-(2-n-butyl-carbamoyl-4-propionamidophenoxy)-2-propanol, m.p. 104°–105° C.

The 1-chloro-3-(2-n-butylcarbamoyl-4-propionamidophenoxy)-2-propanol used as starting material may be obtained as follows:

A mixture of 4 parts of ethyl 2-hydroxy-5-nitrobenzoate, 10 parts of propionic anhydride and 150 parts of ethanol is shaken with hydrogen in the presence of 0.5 part of a 5 percent palladium-on-charcoal catalyst until uptake of hydrogen is complete. The mixture is then poured into 500 parts of water and sodium bicarbonate is added until the pH of the solution is nine. The resulting aqueous suspension is extracted twice with 100 parts of ether each time and the combined ethereal extracts are dried and evaporated to dryness. The residue is crystallized from a mixture of ethyl acetate and petroleum ether (b.p. 60°–80° C.) and there is thus obtained ethyl 2-hydroxy-5-propionamidobenzoate, m.p. 96°–98° C.

A solution of 3.5 parts of ethyl 2-hydroxy-5-propionamidobenzoate in 50 parts of n-butylamine is heated under reflux for 5 hours and then evaporated to dryness. The residue is dissolved in a mixture of five parts of ethanol and 50 parts of water and the solution is acidified with concentrated aqueous hydrochloric acid. A further 50 parts of water are added and the mixture is extracted into 100 parts of ether. The ethereal extract is dried and evaporated to dryness and the residue is crystallized from a mixture of ethyl acetate and petroleum ether (b.p. 60°–80° C.). There is thus obtained 2-hydroxy-5-propionamido-N-(n-butyl)benzamide, m.p. 118°–120° C.

A mixture of 1,8 parts of 2-hydroxy-5-propionamido-N-(n-butyl)benzamide, 20 parts of epichlorohydrin and 0.1 part of piperidine is heated at 90° C. for seven hours and is then evaporated to dryness under reduced pressure. There is thus obtained 1-chloro-3-(2-n-butylcarbamoyl-4-propionamidophenoxy)-2-propanol as an oil.

EXAMPLE 9

A mixture of 1.5 parts of 1,2-epoxy-3-(4-ethylcarbamoyl-2-n-propylphenoxy)propane and 20 parts of isopropylamine is left at ambient temperature for 24 hours. The mixture is evaporated to dryness under reduced pressure and the residue is stirred with a mixture of 25 parts of aqueous N-hydrochloric acid and 25 parts of ether. The acidic aqueous layer is separated and basified with aqueous 11N-sodium hydroxide solution, and the mixture is extracted with 25 parts of ethyl acetate. The ethyl acetate layer is separated, dried over anhydrous magnesium sulphate and evaporated to dryness under reduced pressure. The residue is crystallized from ethyl acetate and there is thus obtained 3-(4-ethylcarbamoyl-2-n-propylphenoxy)-1-isopropylamino-2-propanol, m.p. 116° C.

The process described above is repeated except that the appropriate amine and 1,2-epoxy-3-aryloxypropane are used as starting materials, and there are thus obtained by similar means the compounds described in the following table:

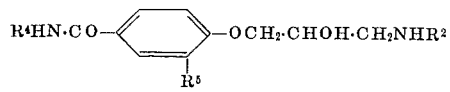

R⁴HN·CO—⟨ ⟩—OCH₂·CHOH·CH₂NHR²
           |
           R⁵

| R² | R⁴ | R⁵ | m.p. (°C.) | crystallization solvent |
|---|---|---|---|---|
| isopropyl | n-propyl | n-propyl | 128 | ethyl acetate |
| isopropyl | ethyl | allyl | 120–121 | acetone |
| isopropyl | n-hexyl | allyl | 100 | acetone |
| isopropyl | p-tolyl | chloro | 186 | acetone/ethanol |
| isopropyl | p-chlorophenyl | chloro | 188 | acetone/ethanol |
| isopropyl | cyclopentyl | chloro | 166–168 | acetone |
| isopropyl | n-nonyl | chloro | 108 | acetone |
| isopropyl | isopropyl | chloro | 150 | acetone |
| t-butyl | isopropyl | chloro | 124 | ethyl acetate |
| isopropyl | benzyl | chloro | 130 | acetone |

| | | | | |
|---|---|---|---|---|
| s-butyl | ethyl | chloro | 90 | ethyl acetate |
| isopropyl | 2-methoxyethyl | chloro | 94 | ethyl acetate |
| isopropyl | allyl | bromo | 136–138 | ethyl acetate |
| isopropyl | n-hexyl | chloro | 124–126 | ethyl acetate |
| isopropyl | isopentyl | chloro | 122 | ethyl acetate |
| cyclopropyl | ethyl | chloro | 90–92 | ethyl acetate |
| ethyl | ethyl | chloro | 135 | ethyl acetate |
| n-butyl | ethyl | chloro | 106–108 | ethyl acetate |
| 1-methyl-2-phenoxyethyl | ethyl | chloro | 112–114 | ethyl acetate |
| 1-methyl-3-isopropyl | ethyl | chloro | 124 | ethyl acetate |
| | 2-hydroxy-1-methylethyl | chloro | 134–136 | acetone |
| 2-hydroxy-1-methylethyl | ethyl | chloro | 116–118 | acetone/ethyl acetate |

EXAMPLE 10

A mixture of 1.5 parts of 1,2-epoxy-3-(4-ethylcarbamoyl-2-n-propylphenoxy)propane and 20 parts of t-butylamine is left at ambient temperature for 24 hours. The mixture is evaporated to dryness under reduced pressure and the residue is stirred with a mixture of 25 parts of aqueous N-hydrochloric acid and 25 parts of ether. The acidic aqueous layer is separated and basified with aqueous 11N-sodium hydroxide solution and the mixture is extracted twice with 50 parts of ether each time. The combined ethereal extracts are dried over anhydrous magnesium sulphate and evaporated to dryness under reduced pressure. The residue is subjected to thick-layer chromatography on a two mm. thick plate of silica gel (Merck, Kieselgel $PF_{254}$ gipshaltig), area 20 cm. × 40 cm., using a mixture of one part by volume of aqueous ammonium hydroxide solution (S.G. 0.89) and 99 parts by volume of methanol as eluting solvent. The material with an $R_F$ value of 0.8 is extracted from the plate with methanol and the methanolic solution is evaporated to dryness under reduced pressure. The residue is crystallized from a mixture of acetone and petroleum ether (b.p. 80°–100° C.) and there is thus obtained 3-(4-ethylcarbamoyl-2-n-propylphenoxy)-1-t-butylamino-2-propanol, m.p. 116°–118° C.

The process described above is repeated except that the appropriate amine and 1,2-epoxy-3-aryloxypropane are used as starting materials, and there are thus obtained by similar means the compounds described in the following table:

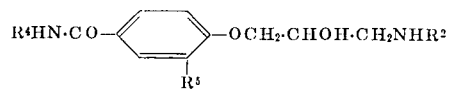

| $R^2$ | $R^4$ | $R^5$ | m.p. (°C.) | $R_F$ value | crystallization solvent |
|---|---|---|---|---|---|
| isopropyl | ethyl | acetyl | 117 | 0.5 | ethyl acetate/petroleum ether (b.p. 80–100°C.) |
| t-butyl | ethyl | allyl | (oil) | 0.6 | — |
| t-butyl | cyclopentyl | chloro | 128 | 0.6 | acetone |
| t-butyl | n-hexyl | allyl | (oil) | 0.6 | — |
| t-butyl | 2-hydroxy-1,1-dimethylethyl | chloro | 72 | 0.5 | ethyl acetate |
| isopropyl | 2-hydroxy-1,1-dimethylethyl | chloro | (oil) | 0.55 | — |
| t-butyl | benzyl | chloro | (oil) | 0.5 | — |
| t-butyl | n-propyl | n-propyl | 124 | 0.8 | acetone |
| isopropyl | 1,1-dimethyl-2-phenylethyl | chloro | (oil) | 0.55 | — |
| t-butyl | 1,1-dimethyl-2-phenylethyl | chloro | (oil) | 0.6 | — |
| t-butyl | n-propyl | methoxy | (oil) | 0.46 | — |

The process described above is repeated except that t-butylamine and 1,2-epoxy-3-(2-chloro-4-diethylcarbamoylphenoxy)propane are used as starting materials. The material having an $R_F$ value of 0.5 is isolated and there is thus obtained 3-(2-chloro-4-diethylcarbamoyl-phenoxy)-1-t-butylamino-2-propanol as an oil.

EXAMPLE 11

The process described in Example 5 is repeated except that 1-chloro-3-(2-chloro-4-n-propylcarbamoylphenoxy)-2-propanol is used as starting material in place of 1-chloro-3-(2-nitro-4-n-propyl-carbamoylphenoxy)-2-propanol, and that the product is characterized as its picrate salt by a similar process to that described in Example 7. There is thus obtained 3-(2-chloro-4-n-propylcarbamoyl-phenoxy)-1-t-butylamino-2-propanol picrate, m.p. 142° C. crystallized from aqueous ethanol).

EXAMPLE 12

A mixture of 2.9 parts of 1-chloro-3-(2-chloro-4-ethyl-carbamoylphenoxy)-2-propanol, 10 parts of isopropylamine and 40 parts of n-propanol is heated under reflux for 24 hours. The mixture is evaporated to dryness under reduced pressure, the residue is stirred with 20 parts of aqueous 2N-hydrochloric acid and the mixture is extracted with 25 parts of ether. The acidic aqueous layer is separated and basified with aqueous 11N-sodium hydroxide solution and the mixture is extracted twice with 25 parts of ethyl acetate each time. The combined ethyl acetate extracts are dried over anhydrous magnesium sulphate and evaporated to dryness under reduced pressure. The residue is crystallized from ethyl acetate and there is thus obtained 3-(2-chloro-4-ethylcarbamoylphenoxy)-1-isopropylamino-2-propanol, m.p. 136°–138° C.

The process described above is repeated except that the appropriate amine and 1-chloro-3-aryloxy-2-propanol are used as starting materials and there are thus obtained by similar means the compounds described in the following table:

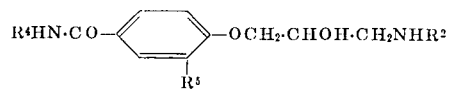

| $R^2$ | $R^4$ | $R^5$ | m.p. (°C.) | crystallization solvent |
|---|---|---|---|---|
| isopropyl | n-butyl | chloro | 128 | acetone |
| cyclopentyl | n-butyl | chloro | 117 | acetone |
| isopropyl | n-pentyl | chloro | 130 | acetone |
| isopropyl | n-propyl | methoxy | 134–136 | acetone |
| n-propyl | ethyl | chloro | 112 | acetone |
| isopropyl | cyclopropyl | chloro | 166 | acetone/ethanol |
| isopropyl | n-hexyl | chloro | 124–125 | acetone |
| isopropyl | phenyl | chloro | 202 | acetone/ethanol |
| isopropyl | allyl | chloro | 120 | ethyl acetate |
| isopropyl | ethyl | bromo | 140 | ethyl acetate |
| isopropyl | n-propyl | bromo | 148 | acetone/ethanol |

EXAMPLE 13

A mixture of 3.25 parts of 1-chloro-3-(2chloro-4-n-hexyl-carbamoyl-phenoxy)-2-propanol, 10 parts of t-butylamine and 30 parts of n-propanol is heated under reflux for 18 hours. The mixture is evaporated to dryness under reduced pressure, the residue is stirred with 25 parts of aqueous 2N-hydrochloric acid and the mixture is extracted twice with 25 parts of ether each time. The acidic aqueous layer is separated and basified with aqueous 11N-sodium hydroxide solution and the mixture is extracted twice with 25 parts of ethyl acetate each time. The combined ethyl acetate extracts are dried over anhydrous magnesium sulphate and evaporated to dryness under reduced pressure. The residue is subjected to thick-layer chromatography on a two mm. thick plate of silica gel (Merck, Kieselgel $PF_{254}$ gipshaltig), area 20 cm. × 40 cm., using a mixture of one part by volume of ammonium hydroxide solution (S.G. 0.89) and 99 parts by volume of methanol as eluting solvent. The material with an $R_F$ value of 0.5 is extracted from the plate with methanol and the methanolic solution is evaporated to dryness under reduced pressure. There is thus obtained 1-t-butylamino-3-(2-chloro-4-n-hexylcarbamoylphenoxy)-2-propanol as an oil.

The process described above is repeated except that the appropriate amine and 1-chloro-3-aryloxy-2-propanol are used as starting materials and there are thus obtained by similar means the compounds described in the following table:

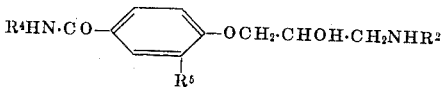

$R^4HN \cdot CO-\underset{R^5}{\text{C}_6\text{H}_3}-OCH_2 \cdot CHOH \cdot CH_2NHR^2$

| $R^2$ $R^4$ | $R^5$ | m.p. (°C.) | $R_F$ value | crystallization solvent |
|---|---|---|---|---|
| 2-hydroxy-1,1-ethyl dimethylethyl | chloro | 129 | 0.5 | acetone/ethanol |
| t-butyl ethyl | chloro | 109 | 0.5 | acetone/ petroleum ether (b.p. 80–100°C.) |
| isopropyl ethyl | nitro | (oil) | 0.7 | — |
| t-butyl allyl | chloro | 118 | 0.5 | ethylacetate/ petroleum ether (b.p. 80–100°C.) |
| t-butyl ethyl | bromo | (oil) | 0.6 | — |
| 2-hydroxy-1,1-ethyl dimethylethyl | bromo | 136–138 | 0.6 | acetone |
| t-butyl n-propyl | bromo | 140 | 0.8 | acetone |

The process described above is repeated except that 1-chloro-3-(2-chloro-4-ethylcarbamoylphenoxy)-2-propanol and diethylamine are used as starting materials. The material having an $R_F$ value of 0.5 is isolated and there is thus obtained 3-(2-chloro-4-ethylcarbamoyl-phenoxy)-1-diethylamino-2-propanol as an oil.

EXAMPLE 14

A mixture of 2.55 parts of 1,2-epoxy-3-(2-chloro-4-ethyl-carbamoylphenoxy)propane and 100 parts of a 12 percent w/v solution of ammonia in methanol is kept at ambient temperature for 72 hours. The mixture is evaporated to dryness under reduced pressure and the residue is stirred with a mixture of 25 parts of aqueous N-hydrochloric acid and 25 parts of ethyl acetate. The acidic aqueous layer is separated, basified with aqueous 11N-sodium hydroxide solution and filtered, and the filtrate is extracted with 25 parts of ethyl acetate. The ethyl acetate extract is dried over anhydrous magnesium sulphate and acidified with ethereal hydrogen chloride solution. The mixture is filtered and the solid residue is crystallized from isopropanol. There is thus obtained 1-amino-3-(2-chloro-4-ethyl-carbamoylphenoxy)-2-propanol, m.p. 198°–200°C.

The various 1-chloro-3-(4-carbamoylphenoxy)-2-propanol derivatives used as starting materials in Examples 3, 11, 12 and 13 may be obtained by a similar process to that described in the last paragraph of Example 3, and the various 1,2-epoxy-3-(4-carbamoyl-phenoxy)propane derivatives used as starting materials in Examples 9, 10 and 14 may be obtained by a similar process to that described in the last paragraph of Example 1.

The various 4-acetoxy- and 4-hydroxy-N-substituted-benzamide derivatives used as intermediates may be obtained from the corresponding 4-hydroxybenzoic acid derivatives as generally described in Examples 3, 5 and 6. Those of the intermediates which have been characterized are shown in the following table:

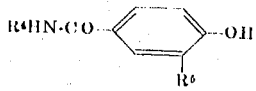

$R^4HN \cdot CO-\underset{R^6}{\text{C}_6\text{H}_3}-OH$

| $R^4$ | $R^5$ | m.p. (°C.) |
|---|---|---|
| n-pentyl | H | 104–106 |
| (corresponding 4-acetoxy derivative) | | 82–84 |
| ethyl | H | 110–112 |
| p-tolyl | H | 208–210 |
| (corresponding 4-acetoxy derivative) | | 176–178 |
| ethyl | chloro | 92 |
| isopropyl | chloro | 88 |
| 2-hydroxy-1,1-dimethylethyl | chloro | 166–168 |
| benzyl | chloro | 114 |
| cyclopropyl | chloro | 180 |
| cyclopentyl | chloro | 96–98 |
| allyl | chloro | 86–88 |
| phenyl | chloro | 186–188 |
| p-tolyl | chloro | 210 |
| p-chlorophenyl | chloro | 184 |
| ethyl | bromo | 120 |
| n-propyl | bromo | 60 |
| allyl | bromo | 280–290 |
| ethyl | nitro | 114 |
| ethyl | n-propyl | 106 |
| n-propyl | n-propyl | 122–124 |
| ethyl | acetyl | 80 |

3Chloro-N,N-diethyl-4-hydroxybenzamide has m.p. 128°–130°C.

EXAMPLE 15

A mixture of 1.0 part of N-ethyl-3-chloro-4-hydroxy-benzamide, 0.4 part of sodium hydroxide, 2 parts of water, 0.67 part of 3-chloro-1-isopropylamino-2-propanol hydrochloride and 12.5 parts of ethanol is heated under reflux for 3 hours. The mixture is evaporated to dryness under reduced pressure and the residue is stirred with a mixture of 25 parts of ethyl acetate and 25 parts of water. The ethyl acetate phase is separated, dried over anhydrous magnesium sulphate and evaporated to dryness under reduced pressure. The solid residue is crystallized from ethyl acetate and there is thus obtained 3-(2-chloro-4-ethylcarbamoylphenoxy)-1-isopropylamino-2-propanol, m.p. 136°–138°C.

EXAMPLE 16

A mixture of 1.25 parts of 1-(N-benzyl-N-isopropylamino)-3-(4-ethylcarbamoylphenoxy)-2-propanol, 50 parts of ethanol, 2 parts of saturated ethereal hydrogen chloride solution and 0.5 part of a 5 percent palladium-on-charcoal catalyst is shaken with hydrogen at ambient temperature and atmospheric pressure until the uptake of hydrogen ceases. The mixture is filtered and the filtrate is evaporated to dryness under reduced pressure. The residue is shaken with a mixture of 10 parts of aqueous N-hydrochloric acid and 25 parts of ethyl acetate. The ethyl acetate layer is separated, dried over anhydrous magnesium sulphate and evaporated to dryness under reduced pressure. The residue is crystallized from acetone, and there is thus obtained 3-(4-ethylcarbamoylphenoxy)-1-isopropylamino-2-propanol, m.p. 128°–130°C.

The 1-(N-benzyl-N-isopropylamino)-3-(4-ethylcarbamoylphenoxy)-2-propanol used as starting material may be obtained as follows:

A mixture of 2.6 parts of 1-chloro-3-(4-ethylcarbamoylphenoxy)-2-propanol, 1.49 parts of N-benzyl-N-isopropylamine and 30 parts of n-propanol is heated under reflux for 18 hours. The mixture is evaporated to dryness under reduced pressure and the residue is stirred with a mixture of 25 parts of aqueous 2N-hydrochloric acid and 25 parts of ethyl acetate. The acidic aqueous layer is separated and basified with aqueous 11N-sodium hydroxide solution, and the mixture is extracted twice with 50 parts of ethyl acetate each time. The combined ethyl acetate extracts are dried over anhydrous magnesium sulphate and evaporated to dryness under reduced pressure. The residue consists of 1-(N-benzyl-N-isopropylamino)-3-(4-ethylcarbamoylphenoxy)-2-propanol and is used without further purification.

EXAMPLE 17

A mixture of 0.5 part of 3-(2-chloro-4-ethylcarbamoylphenoxy)-1-isopropylamino-2-propanol, 4 parts of an aqueous 36 percent w/v solution of formaldehyde and 25 parts of ethanol is heated under reflux for 6 hours. The mixture is evaporated to dryness under reduced pressure, the residue is dissolved in 10 parts of ethanol and an excess of a saturated ethanolic solution of picric acid is added. The mixture is filtered and the solid residue is crystallized from aqueous ethanol. There is thus obtained 5-(2-chloro-4-ethylcarbamoylphenoxymethyl)3-isopropyloxazolidine dipicrate, m.p. 86°C.

EXAMPLE 18

A solution of 1.5 parts of racemic 3-(2-chloro-4-ethyl-carbamoylphenoxy)-1-isopropylamino-2-propanol in 10 parts of ethanol is added to a solution of 1.9 parts of (+)—O,O-di-p-toluoyltartaric acid in 10 parts of ethanol. The mixture is maintained at a temperature of −20° C. for 48 hours, and crystallization is then induced by scratching. The mixture is filtered and the solid residue is crystallized from ethanol. The produce has m.p. 172°–174° C. (with decomposition). The crystallized solid is stirred with a mixture of 10 parts of aqueous N-sodium hydroxide solution and 10 parts of ethyl acetate, and the ethyl acetate phase is separated, dried over anhydrous magnesium sulphate and evaporated to dryness under reduced pressure. The solid residue is stirred with a mixture of six parts of allylamine and 12 parts of petroleum ether (b.p. 60°–80° C.) at ambient temperature for 15 minutes. The mixture is filtered and the filtrate is evaporated to dryness under reduced pressure. The residue is stirred with a further six parts of allylamine and 12 parts of petroleum ether (b.p. 60°–80° C.) for 15 minutes. The mixture is filtered and the filtrate is evaporated to dryness under reduced pressure. The residue is stirred with five parts of ether and the mixture is filtered. The solid residue consists of (−)-3-(2-chloro-4-ethylcarbamoylphenoxy)-1-isopropyl-amino-2-propanol, m.p. 122°–124° C., $[\alpha]_D^{21}= -13.0°$ (c, 1.9 percent in aqueous N-hydrochloric acid).

The process described above is repeated except that (−)—O,O-di-p-toluoyltartaric acid is used in place of (+)—O,O-di-p-toluoyl-tartaric acid, and that five parts instead of 10 parts of ethanol are used. There is thus obtained (+)-3-(2-chloro-4-ethylcarbamoyl-phenoxy)-1-isopropylamino-2-propanol, m.p. 122°–124° C., $[\alpha]_D^{21}= +13.2°$ (c, 2.1 percent in aqueous N-hydrochloric acid).

The β-adrenergic blocking effect of a selection of the alkanolamine derivatives of the invention was measured in terms of the inhibition of isoprenaline-induced tachycardia in cats by the following procedure, which is standard in the art for the measurement of such activity and which is based on the procedure described by Black and Stephenson in The Lancet, August 1962, p.311.

A cat was anaesthetized with chloralose, at a dose of 80 mg./kg. bodyweight given intravenously, and its heart rate and blood pressure were continuously recorded. Isoprenaline [1-(3,4-dihydroxyphenyl)-2-isopropylaminoethanol] was then administered intravenously to the cat at intervals of 10 minutes, at a dose of 0.20 μg./kg. bodyweight each time. Each injection of isoprenaline caused a transient increase in heart rate (a tachycardia) and a transient fall in blood pressure, and the mean of three increases in heart rate, measured in beats per minute, was termed the control tachycardia. The compound under test was then administered to the cat by continuous intravenous infusion at a given rate (usually in the range between one and 10 μg./kg. bodyweight/minute) for a period of 30 minutes, the heart rate and blood pressure of the cat still being continuously recorded (it being understood that administration of the compound might in itself have some effect on the heart rate and/or blood pressure of the cat). Isoprenaline was again administered intravenously at intervals of 10 minutes at a dose of 0.20 μg./kg. bodyweight each time, and the tachycardia caused by the administration of isoprenaline 30 minutes after the beginning of infusion of the test compound was measured (the increase in heart rate being calculated using the heart rate immediately before administration of isoprenaline, and not necessarily that at the beginning of the experiment, as the base-line). The difference between this tachycardia and the control tachycardia was then expressed as a percentage of the control tachycardia, this percentage being termed the "percentage inhibition of the control tachycardia".

The rate of infusion of test compound was then increased, in geometric progression, such that test compound was administered for successive periods of 30 minutes at each rate, and isoprenaline-induced tachycardia was measured as described above, until a dose was reached which caused a 75 percent inhibition of the control tachycardia. The percentage inhibition of control tachycardia was then plotted graphically against the logarithm of the total amount of test compound infused during the 30 minutes immediately preceding the measurement of each tachycardia, and that dose which, when infused during 30 minutes produced a 50 percent inhibition of the control tachycardia, was determined from the graph. This dose, which is designated the $ED_{50}$ and is recorded in μg./kg. bodyweight, is taken as a measure of the β-adrenergic blocking activity of the test compound.

The results obtained with the preferred alkanolamine derivatives of the invention are as follows:

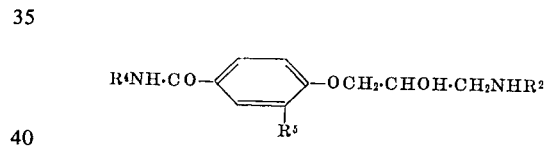

| R² | R⁴ | R⁵ | $ED_{50}$(μg./kg.) |
|---|---|---|---|
| t-butyl | n-hexyl | chloro | 24 |
| t-butyl | cyclopentyl | chloro | 42 |
| isopropyl | isopropyl | chloro | 72 |
| t-butyl | isopropyl | chloro | 78 |
| t-butyl | ethyl | chloro | 32 |
| t-butyl | allyl | chloro | 37 |
| t-butyl | ethyl | allyl | 59 |
| t-butyl | n-hexyl | allyl | 54 |
| t-butyl | n-propyl | bromo | 69 |
| t-butyl | ethyl | bromo | 33 |
| isopropyl | n-hexyl | bromo | 80 |
| isopropyl | allyl | bromo | 55 |
| t-butyl | ethyl | n-propyl | 36 |
| t-butyl | n-propyl | n-propyl | 44 |

It is clear from the abovementioned results that the alkanolamine derivatives of the invention possess β-adrenergic blocking activity in warm-blooded animals. It is recommended that, in the treatment of warm-blooded animals, the alkanolamine derivatives of the invention be administered orally at a dose of between 0.25 and 10 mg. per kg. bodyweight daily, or at an intravenous dose of between 0.01 and 0.25 mg. per kg. bodyweight daily. In particular, when used in the treatment of man, it is recommended that a total daily oral dose of between 20 mg. and 600 mg., or a total daily intravenous dose of between one mg. and 20 mg., is used.

What we claim is:

1. An alkanolamine derivative selected from compounds of the formula:

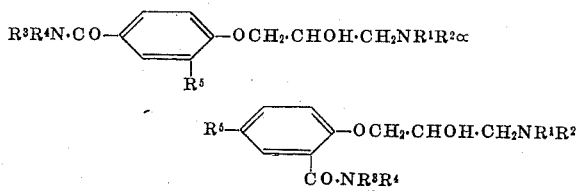

wherein $R^1$ is hydrogen or alkyl of up to four carbon atoms; wherein $R^2$ is hydrogen, of $R^2$ is unsubstituted alkyl of up to six carbon atoms, or $R^2$ is alkyl of up to six carbon atoms which is substituted by one hydroxy, phenyl or phenoxy radical, of $R^2$ is cycloalkyl of up to eight carbon atoms; wherein $R^3$ is hydrogen or alkyl of up to four carbon atoms; wherein $R^4$ is alkyl, hydroxyalkyl or alkoxyalkyl each of up to 10 carbon atoms, or cycloalkyl of up to eight carbon atoms, or alkenyl of up to six carbon atoms, alkyl of up to six carbon atoms which is substituted by phenyl, said phenyl being unsubstituted or substituted by one or more substituents selected from halogen and alkyl and alkoxy each of up to four carbon atoms; and wherein $R^5$ is hydrogen or halogen or alkanoylamino of up to 10 carbon atoms, or alkyl of up to four carbon atoms, or alkenyl or alkanoyl each of up to six carbon atoms, or nitro, or alkoxy or alkenyloxy each of up to five carbon atoms and the non-toxic, pharmaceutically-acceptable acid-addition salt thereof.

2. An alkanolamine derivative as claimed in claim 1 which is selected from compounds of the formula given in claim 1 wherein $R^1$ is hydrogen, or ethyl; wherein $R^2$ is hydrogen, n-propyl, isopropyl, n-butyl, s-butyl, t-butyl, 2-hydroxy-1-methylethyl, 2-hydroxy-1,1-dimethylethyl, 1-methyl-2-phenoxyethyl, 1-methyl-3-phenylpropyl, cyclopropyl or cyclopentyl; wherein $R^3$ is hydrogen or ethyl; wherein $R^4$ is methyl, ethyl, n-propyl, isopropyl, n-butyl, n-pentyl, isopentyl, n-hexyl, n-nonyl, 2-hydroxy-1-methylethyl, 2-hydroxy-1,1-dimethylethyl, 2-methoxyethyl, cyclopropyl, cyclopentyl, allyl, benzyl or 1,1-dimethyl-2-phenylethyl; and wherein $R^5$ is hydrogen, chlorine, bromine, propionamido, n-propyl, allyl, nitro, methoxy, or acetyl; and the non-toxic, pharmaceutically-acceptable acid-addition salt thereof.

3. An alkanolamine derivative as claimed in claim 1 which is selected from compounds of the formula.

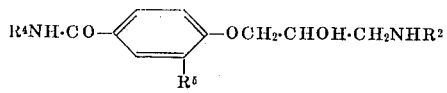

wherein $R^2$, $R^4$ and $R^5$ have the meanings stated in claim 1 and the non-toxic-pharmaceutically-acceptable acid-addition salt thereof.

4. An alkanolamine derivative as claimed in claim 3 which is selected from compounds of the formula given in claim 3 wherein $R^2$ is isopropyl or t-butyl; wherein $R^4$ is alkyl of up to 10 carbon atoms and $R^5$ is chlorine, bromine, n-propyl or allyl; and the non-toxic, pharmaceutically-acceptable acid-addition salt thereof.

5. An alkanolamine derivative as claimed in claim 3 which is selected from compounds of the formula given in claim 3 wherein $R^2$ is isopropyl or t-butyl, $R^4$ is ethyl, isopropyl, n-hexyl, cyclopentyl or allyl and $R^5$ is chlorine; and the non-toxic, pharmaceutically-acceptable acid-addition salt thereof.

6. An alkanolamine derivative as claimed in claim 1 which is selected from 3-(2-chloro-4-n-hexylcarbamoylphenoxy)-1-t-butylamino-2-propanol; and the non-toxic, pharmaceutically-acceptable acid-addition salt thereof.

7. An acid-addition salt as claimed in claim 1 which is a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate).

8. An alkanolamine derivative as claimed in claim 3 which is selected from compounds of the formula given in claim 3 wherein $R^2$ is isopropyl or t-butyl; wherein $R^4$ is cyclopropyl, cyclopentyl, allyl or benzyl and $R^5$ is chlorine; and the non-toxic, pharmaceutically-acceptable acid-addition salts thereof.

9. An alkanolamine derivative as claimed in claim 3 which is selected from compounds of the formula given in claim 3 wherein $R^2$ is isopropyl or t-butyl, $R^4$ is ethyl or n-propyl and $R^5$ is bromine or n-propyl; and the non-toxic, pharmaceutically-acceptable acid-addition salt thereof.

10. An alkanolamine derivative as claimed in claim 3 which is selected from compounds of the formula given in claim 3 wherein $R^2$ is isopropyl or t-butyl, $R^4$ is ethyl or n-hexyl and $R^5$ is allyl; and the non-toxic, pharmaceutically-acceptable acid-addition salt thereof.

11. An alkanolamine derivative as claimed in claim 3 which is selected from compounds of the formula given in claim 3 wherein $R^2$ is isopropyl, $R^4$ is n-hexyl or allyl and $R^5$ is bromine; and the non-toxic, pharmaceutically-acceptable acid-addition salt thereof.

12. An alkanolamine derivative as claimed in claim 1 which is selected from 3-(2-chloro-4-cyclopentyl-carbamoylphenoxy)-1-t-butylamino-2-propanol; and the non-toxic, pharmaceutically-acceptable acid-addition salt thereof.

13. An alkanolamine derivative as claimed in claim 1 which is selected from 3-(2-chloro-4-isopropyl-carbamoylphenoxy)-1-isopropylamino-2-propanol; and the non-toxic, pharmaceutically-acceptable acid-addition salt thereof.

14. An alkanolamine derivative as claimed in claim 1 which is selected from 3-(2-chloro-4-isopropyl-carbamoylphenoxy)-1-t-butylamino-2-propanol; and the non-toxic, pharmaceutically-acceptable acid-addition salt thereof.

* * * * *